US007734631B2

(12) United States Patent
Richardson et al.

(10) Patent No.: US 7,734,631 B2
(45) Date of Patent: Jun. 8, 2010

(54) ASSOCIATING INFORMATION WITH AN ELECTRONIC DOCUMENT

(75) Inventors: Matthew R. Richardson, Seattle, WA (US); Eric D. Brill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 11/227,937

(22) Filed: Sep. 15, 2005

(65) Prior Publication Data

US 2006/0242574 A1 Oct. 26, 2006

Related U.S. Application Data

(60) Provisional application No. 60/674,628, filed on Apr. 25, 2005.

(51) Int. Cl.
*G06F 7/00* (2006.01)
*G06F 17/00* (2006.01)

(52) U.S. Cl. .................. 707/749; 707/750; 715/233

(58) Field of Classification Search ........................ None
See application file for complete search history.

(56) References Cited

U.S. PATENT DOCUMENTS

| 5,146,552 | A | * | 9/1992 | Cassorla et al. ............. 715/512 |
| 5,708,825 | A | * | 1/1998 | Sotomayor ................... 715/205 |
| 5,732,399 | A | * | 3/1998 | Katiyar et al. .................. 705/8 |
| 5,761,436 | A | * | 6/1998 | Nielsen ....................... 709/245 |
| 5,806,079 | A | * | 9/1998 | Rivette et al. ................ 715/210 |
| 6,065,001 | A | * | 5/2000 | Ohkubo et al. .................. 707/3 |
| 6,072,493 | A | * | 6/2000 | Driskell et al. .............. 715/854 |
| 6,088,026 | A | * | 7/2000 | Williams .................. 715/500.1 |
| 6,347,398 | B1 | | 2/2002 | Parthasarathy et al. |
| 6,496,931 | B1 | * | 12/2002 | Rajchel et al. .............. 713/168 |
| 6,535,889 | B1 | * | 3/2003 | Headrick et al. ......... 707/104.1 |
| 6,549,916 | B1 | * | 4/2003 | Sedlar .......................... 707/200 |
| 7,058,726 | B1 | * | 6/2006 | Osaku et al. ................. 709/245 |
| 7,107,518 | B2 | * | 9/2006 | Ramaley et al. ........... 715/501.1 |
| 7,280,995 | B1 | * | 10/2007 | Sedlar .............................. 707/1 |
| 2002/0032839 | A1 | * | 3/2002 | Yamamoto et al. ........... 711/118 |
| 2002/0143691 | A1 | | 10/2002 | Ramaley et al. |
| 2003/0149694 | A1 | * | 8/2003 | Ma et al. ........................ 707/9 |
| 2005/0038814 | A1 | * | 2/2005 | Iyengar et al. ............ 707/104.1 |
| 2005/0078190 | A1 | * | 4/2005 | Bloom et al. ........... 348/207.99 |
| 2005/0144064 | A1 | * | 6/2005 | Calabria et al. ............... 705/14 |

FOREIGN PATENT DOCUMENTS

WO WO2004079522(A2) 9/2004

OTHER PUBLICATIONS

'RaptiveX RapEngine ActiveX Instant Messaging OCX'. Datasheet (Online), Rapman.com, Aug. 3, 1999, retrieved Jul. 1, 2007. http://www.freedownloadscenter.com/Network_and_Internet/Conferencing_and_Collaboration_Tools/RaptiveX_RapEngine_ActiveX_Instant_Messaging_OCX.html.
'Gaim-Encryption' Product Manual (Online). Publisher Unknown. Mar. 25, 2004, retrieved Jul. 1, 2007. http://www.gaim-encryption.sourceforge.net/> Last accessed Jan. 25, 2008 (Gaim-Encryption is now Pidgin-Encryption—http://sourceforge.net/projects/gaim-encryption).
International Search Report for PCT Application No. 06/12649 dated Oct. 26, 2007, 3 pages.
Office Action in 200680013508.9 dated Feb. 1, 2009, 11 pages.

* cited by examiner

*Primary Examiner*—Pierre M Vital
*Assistant Examiner*—Augustine Obisesan
(74) *Attorney, Agent, or Firm*—Lee & Hayes, PLLC

(57) ABSTRACT

A system for associating information comprises an association module that uses anchoring information to associate a first piece of information with a second piece of information, wherein the second piece of information is not part of the first piece of information. The system further includes a rendering module that presents the second piece of information for use. Methods for using such a system are also described.

10 Claims, 14 Drawing Sheets

ASSOCIATING INFORMATION WITH AN ELECTRONIC DOCUMENT

CROSS-REFERENCE TO RELATED APPLICATION

This application claims the benefit of U.S. Provisional Patent application Ser. No. 60/674,628 entitled "SYSTEM AND METHOD FOR ADDING INTERACTIVE CONTENT TO WEB PAGES" and filed on Apr. 25, 2005. The entirety of the above-referenced application is incorporated by reference herein.

BACKGROUND

The Internet has evolved into a communication platform upon which a variety of information-based services can be provided. One of the most popular of these services is the provision of electronic documents constructed using hypertext markup language (HTML). These documents are often referred to as web pages and are available from computing locations or sites on a logical segment of the Internet commonly referred to as the World Wide Web, or simply the Web. Information available on these Web sites and servers is typically accessed using a Web browser executing on a remote computer. For example, a user can launch a Web browser and access a Web site by entering a Uniform Resource Locator (URL) of the Web site into an address bar of the Web browser and pressing the enter key on a keyboard or clicking a button with a mouse. The URL typically includes three pieces of information that facilitate access: a protocol indicator that designates a set of rules or standards for the exchange of information in computer communication, a domain name that is often based on the name of an organization that maintains the Web site, and a path to the desired document within the domain. Standard Web browsers can use the information included in a URL to establish a connection with a Web server and obtain information from that Web server.

In addition to Web sites and Web pages, other types of services are available. Among those services are electronic mail, instant messaging, chat services, audio or video services, and other information services. Typically, each service available on the Internet has existed in isolation from other services. For example, a user can access a Web site using a Web browser but must open an audio application to access audio information as a separate service. Additionally, a user may have to open a third application to access a chat service and a fourth application to access a messaging service.

Typically, although information content from each type of service exists in isolation from other services, such information can be logically related in a variety of different ways. For example, information can be logically related in the sense that information available from each service can refer to information available on another service. Also, information from more than one available service can be topically related, originate from the same source, or be related in some other fashion. Current systems fail to provide any ability to integrate information from various services in logical and meaningful ways.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

A rendering module can obtain information, such as a Web page, from an information source using a network. An associative module can analyze that obtained information and use results of its analysis to identify and locate key or important pieces of the information. This information, among other types, can be used as an anchor with which to associate other information in addition to the original information. Additional information can be presented to a user.

A variety of additional types of information or information services can be provided to a user based upon an analysis of the content of the information obtained by the user, for example, content of a Web page. Content from Web logs that relate or refer to a Web page currently being viewed by the user can be presented along with the currently-viewed Web page. Among the possible types of content that can be presented are advertising-based content and content created by other visitors to a Web site, such as notes, comments, ratings, and reviews. Also, one or more hyperlinks from a Web page that references the present Web page can be presented. Additionally, services such as automatic connection to relevant chat room discussions and page-biased searches can be provided.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
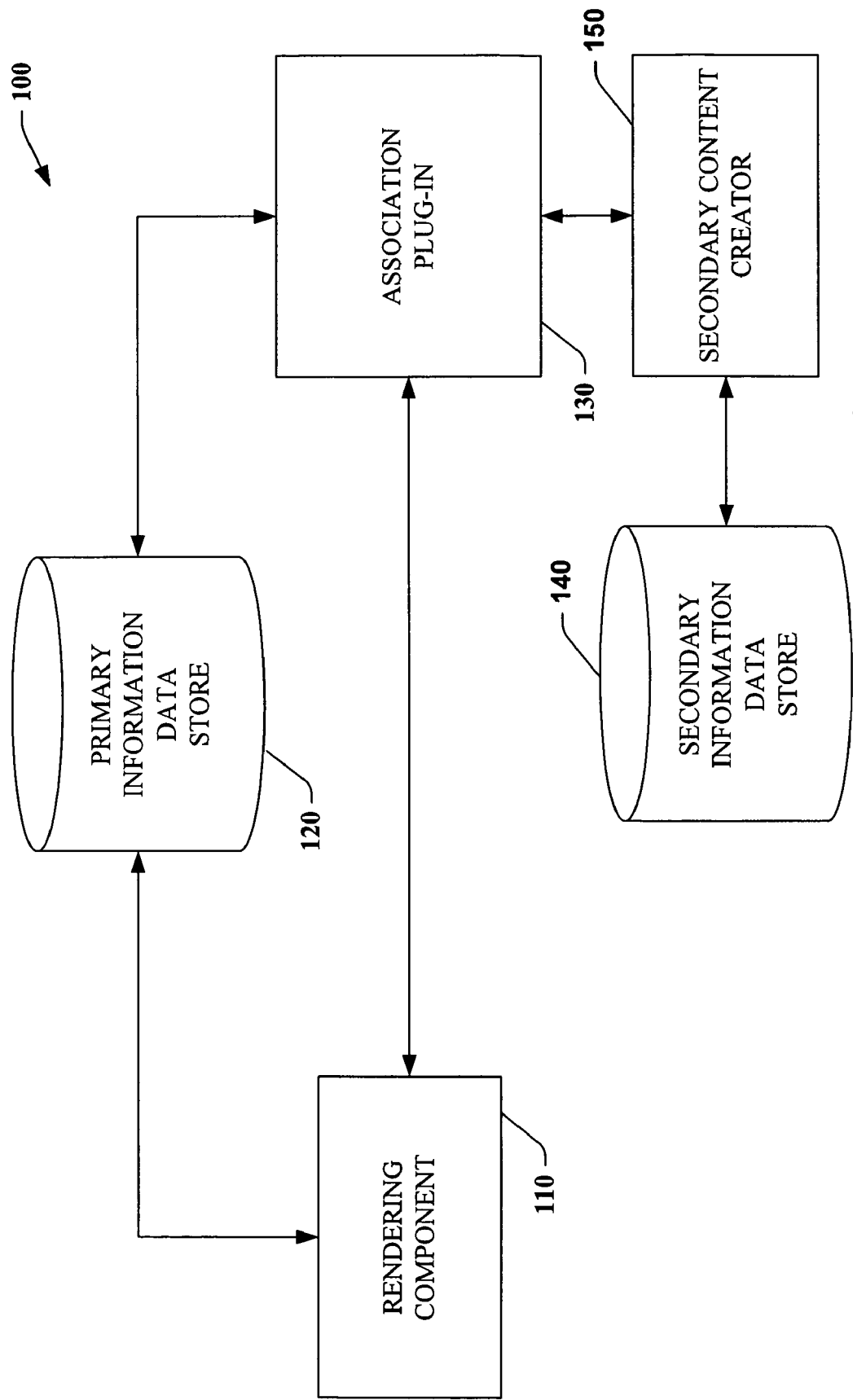
FIG. 1 is a system block diagram of an associative information system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a system block diagram of an interactive information system 100. The interactive information system 100 includes a rendering component 110 that can obtain information from a primary information data store 120. The rendering component 110 can be a Web browser or another component that has the capability to obtain and present information. Specifically, the rendering component 110 can be a stand-alone application that can be launched and operated by a user or can be a module that is designed to be used in conjunction with another component, such as an HTML rendering engine for an email application or another such component. The rendering component 110 can present obtained information to a user on a visual display or some other human-computer interface such as a speech-based interface or a Braille interface, among others.

The primary information data store 120 can be a database, an intranet, the World Wide Web, the Internet, a file share, or some other source of information, specifically including a source of information that can be accessed remotely. Information included in the primary information data store 120 can depend upon a specific implementation of the primary information data store 120 but generally can include any information in an electronic or machine-readable form. Specifically, information stored in the primary information data store can include Web pages from the Internet or an intranet, text documents in a variety of formats, graphical image information, audio information, video information, multimedia information, and other suitable forms of information.

An association plug-in 130 can communicate with the rendering component 110 and the primary information data store 120 to obtain information that the rendering component 110 can present to a user. Additionally or alternatively, the interactive plug-in 130 can obtain additional information from another information source such as the secondary information data store 140. The secondary information data store 140 can be implemented in much the same way as the primary information data store 120 and can include the same types of information, among others. Specifically, the secondary information data store 140 can include notes, documents such as Web pages, intranet pages, text documents in a variety of formats, graphical or audio information, search-related information including search terms or results and access to search engines, wikis, Web logs (blogs), RSS or other news feeds, chat content including notification-based chat content, instant message information including messages or user names, tags, inlinks, outlinks, and any other information that can be stored or presented in an electronic or machine-readable format.

Information included in the secondary information data store 140 can be created by a secondary content creation module 150. Those of ordinary skill in the art will recognize from reading this disclosure that implementation details of the secondary content creation module 150 can vary depending upon a specific type of information to be created for use with the secondary information data store 140. Specifically, depending upon such content, the secondary content creation module 150 can be a text editor, a word processor, a spreadsheet program, a slideshow or presentation program, a Web page editor, a graphics program, an audio program, a Web logging (blogging) tool, a chat program, an instant messaging program, or some other suitable component, specifically including a combination of some or all of the foregoing examples.

The association plug-in 130 can relate or associate information from the secondary information data store 140 with information originally obtained from the primary information data store 120 for display by the rendering component 110. Specifically, the additional information from the secondary information data store 140 can be anchored to information from the primary information data store 120. Such anchoring or association can be accomplished in a variety of ways. For example, a domain name, such as example-domain-name.tld, associated with a Web page can be used as an anchor for a piece of information from the secondary information data store 140. Similarly, a fully- or partially-qualified uniform resource locator (URL), including a relative URL, of a currently- or previously-accessed Web page or other resource can be used as an anchor. Other possible anchors include, but are not limited to, locations of files on file shares or other remote locations, keywords included in content from the primary information data store 120, or form data, among others.

In one example, information from the secondary information data store 140 can be a note that includes some text. The note can be anchored to a Web page by associating the note with the URL of the Web page. The note could also be anchored to a piece of form data. For instance, if the form data is a postal zip code, the note can appear whenever a user enters that zip code into a form. As another example, the note can be anchored to specific keywords. When a user views information from the primary information data store 120 that includes such keywords, the note can be displayed to the user by the rendering component 110. The note can be replaced with any content from the secondary information data store 140. Generally, any content from the secondary information data store 140 can be anchored using any appropriate anchor to any content from the primary information data store 120 in any appropriate combination.

It should be noted that although the additional information can be anchored to or associated with the information originally obtained, content of the additional information does not have to be related to content included in the information originally obtained. For example, the information originally obtained can be a Web page about computer programming languages and the additional information can be a link to a search engine. In this example, the link to the search engine has no connection with the content of the Web page. Many other types of additional content or additional functions can be used or provided by the association plug-in 130.

An example based upon Web pages follows. The rendering component 110 can retrieve a Web page from the primary information data store 120. The Web page can be presented to a user by the rendering component 110. The association plug-in 130 can analyze the Web page to determine which content of the Web page is important. A variety of approaches can be employed to analyze the Web page. Among these approaches is a technique of creating a list of terms that are included in the web page and use the term frequency-inverse document frequency (TF-IDF) algorithm to create a probabilistic summary of the content of the Web page. The association plug-in 130 can use content of the Web page to identify other content to be presented to the user. This other content can include, among other things, content from interactive chat rooms organized around topics related to the Web page, content from Web log (blogs) entries or RSS or other news feeds that are related to the Web page or that specifically mentioned the Web page, hyperlinks from other pages that specifically point to the Web page, access to a search engine, advertising that is related to the content of the Web page, or content in the form of comments made by other visitors to the Web page.

The association plug-in 130 can be implemented in a variety of ways that can depend in large part upon a specific implementation of the rendering component 110, among other factors that will be readily apparent to one of ordinary skill in the art upon reading this disclosure. In one exemplary implementation, the association plug-in 130 can be executable code that runs in a sidebar or similar area of a window or a Web browser. The association plug-in 130 can also be a stand-alone application or other suitable executable code. The association plug-in 130 can be a notation component that provides a user with the ability to post a notice that can be associated with a specific URL.

The notice can be informational in nature, including such things as hyperlinks to related subjects, information on products or services that are similar to products or services mentioned in a Web page, or other information. The notice can also be organizational in the sense that the notice can be used to organize personal notes by URL, such as notes regarding research papers at a specific home page. Social applications of the notice are also possible by using the notice to post a message to another user who visits a URL with which the notice is associated. The message can be intended to another person who will be attending an event, another person with interests that are similar to interests of the creator of the message, a part of a discussion regarding a topic of a Web page, or any other type of message. The notice can also have an entertainment purpose such as providing humor or being part of an online game.

Figure 2:
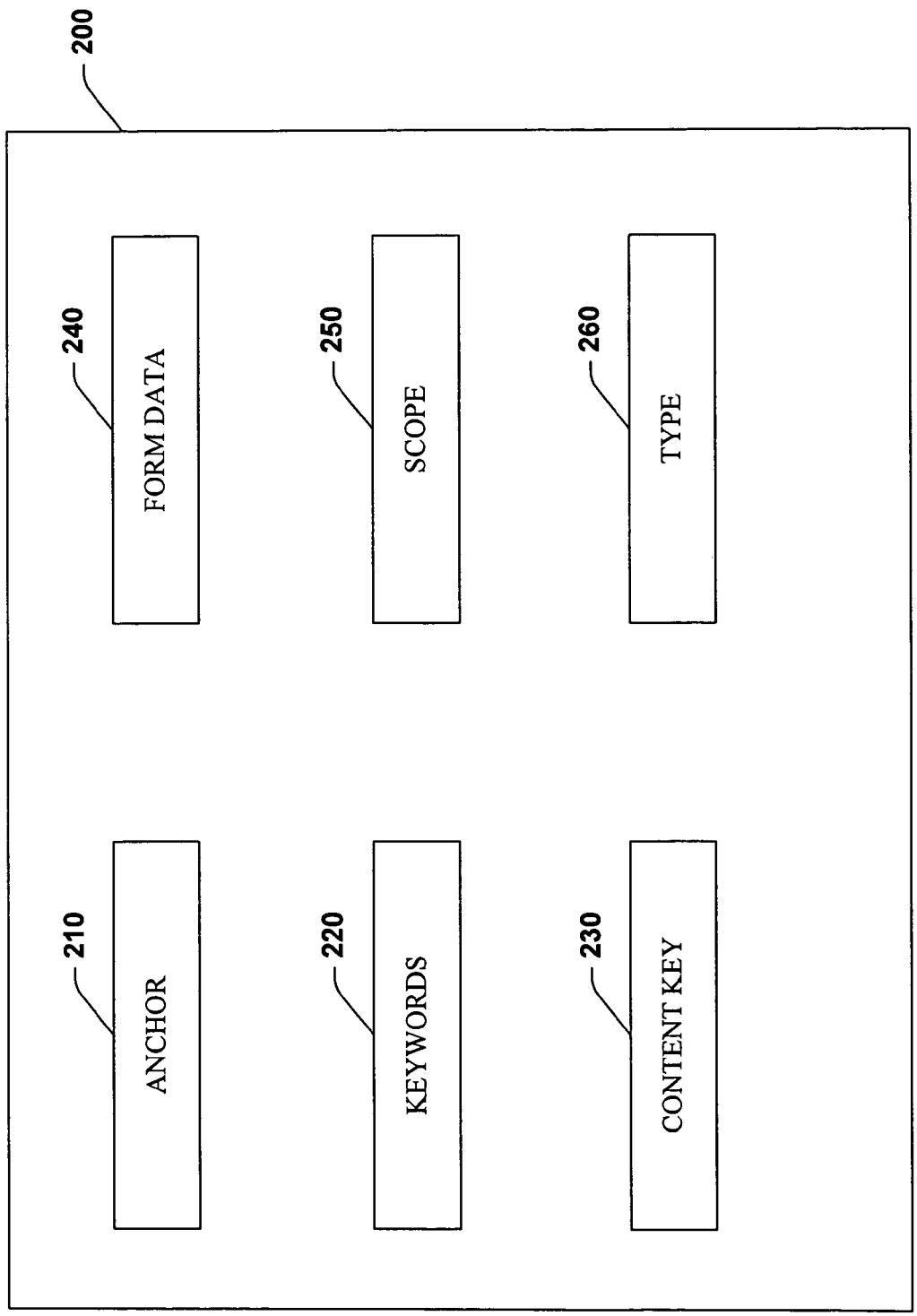
FIG. 2 is a block diagram of a note.

FIG. 2 is a block diagram of a note 200. The note 200 can be used by an association plug-in, such as the association plug-in 130 of FIG. 1, to convey information that can be associated with some online content. Specifically, the information to be conveyed can include any of the types of information previously disclosed and described in conjunction with FIG. 1.

The note 200 can include a plurality of fields. An anchor field 210 can include information that can be used to anchor content of the note 200 to an information location. Information in the anchor field 210 can include a URL, a domain name, or a root domain, among other location identifiers. The anchor field 210 can be used to describe any appropriate anchor, specifically including the types of anchors previously disclosed and described in conjunction with FIG. 1. The anchor field 210 can be used to associate content that can be used by an association plug-in with some information location.

Based upon the type of anchor and other factors, the note 200 can include a variety of fields. A keywords field 220 can include keywords that relate to content and can be used for indexing or search purposes. A content key field 230 can include some keywords or phrases that can be used to locate content, such as a Web page, that includes or matches information in the content key field 230. A form data field 240 can include information that can be used to search for similar information in forms. The form data field can also include form information such as one or more form field names to match a form field to a value for that field.

A scope field 250 can include information regarding a level at which a note, such as the note 200, can be distributed. For example, the scope field 250 can indicate that the note 200 is private and should only be viewable by its creator. The scope field 250 can also indicate that group access is permitted for members of a particular group or groups. These groups can be defined based upon some criterion or can include preselected members, among other ways of defining membership. Further, public access can be indicated by information in the scope field 250 such that the note 200 can be viewed by anyone.

The note 200 can also include a type field 260. Information in the type field 260 can be used to define different types of notes. For example, different types can include simple text boxes, pictures, discussion threads, or user-defined types, among others. Different types of notes can be displayed to a user in different ways to provide visual cues regarding the specific type of not being presented. It should be noted that presence of these fields can provide the ability for a user to filter notes based upon personal preferences. Additionally, notes such as the note 200 can be static in the sense that its content can be fixed or can be dynamic. A dynamic note, for example, can request updated information from a server each time the dynamic note is activated.

In another exemplary implementation, a user can specify a provider of content such as a note 200 from which the user desires to obtain content. The user can also specify a region within which such content can be displayed. One possible method of specifying such a region is by providing a graphical tool that the user can place in a sidebar of a Web browser window. The user can also select from among other options such as closing notes, having notes automatically refresh content, have notes provide labeled sub-bars that can categorize information, associate a note with one or more anchors, set an expiration date, restrict dissemination of the note, and create notes anonymously, among other things.

Perceived utility of notes can be subject to a network effect where a value of a note system increases with a number of users. To provide some initial value, when initializing a note system, a variety of techniques can be used. For example, notes can be shared across URLs. Notes can also provide automatic annotation of Web sites, blogs, newsgroups, and discussion forums, among others. Dynamic notes and other content boxes can readily supply content. Scenario sites that demonstrate uses for notes can also be created. Additionally, an application programming interface (API) for notes can be provided to encourage developers to create their own notes. Search functions for notes can also add to their usefulness. Prizes can also be awarded to users of notes to encourage additional use. Also, popular Web sites can be used to promote installation and further use of notes by users. At least some of those popular Web sites can be formally engaged as promoters of notes. Also, certain content can be provided only through use of notes such that installation of notes components can be required to access that content.

Notes can also be subjected to filtering and ranking functions. Ordering of notes can be accomplished according to a variety of social networking or web of trust networking concepts. Notes that are anchored to a specific URL can be ranked more (or less) highly than notes that are simply anchored to a domain name. Ranking functions can also be employed based at least in part upon one or more factors such as a scope of a note, an author of a note, a date of creation of a note, a preference profile of a user, a filter function, link analysis, feedback for a note such as a score or whether the note was closed by a user, and thresholds for note rankings, among others.

Privacy concerns for use of notes can be addressed in a variety of ways. For example, a component can request multiple notes from different URLs to obscure identifying information for a note that is actually desired. This technique can be used in combination with a prefetching scheme. A one-way hash of a URL for the note can be created and sent to a server instead of a cleartext request. Additionally or alternatively, an intermediate server can be employed to obscure the identity of a user requesting a particular note.

Along with notes, an interactive component can be a web chat component that can allow for dynamic chat sessions between or among users. Such chat sessions can also be anchored to a URL or a domain name, among others. Chat sessions can also be anchored to more than one site to provide for more varied discussion. Such chat sessions can also be notification-based such that a user can be notified when another user arrives at a specified site and desires to participate in a chat session with other users. Other Web-aware applications can also be implemented, such as a listing component that provides a list of Web pages that link to a Web page being viewed, a page summary component that summarizes content on a currently viewed Web page, and a search component that provides links to search engine searches for terms that appear frequently in a Web page, among others.

Figure 3:
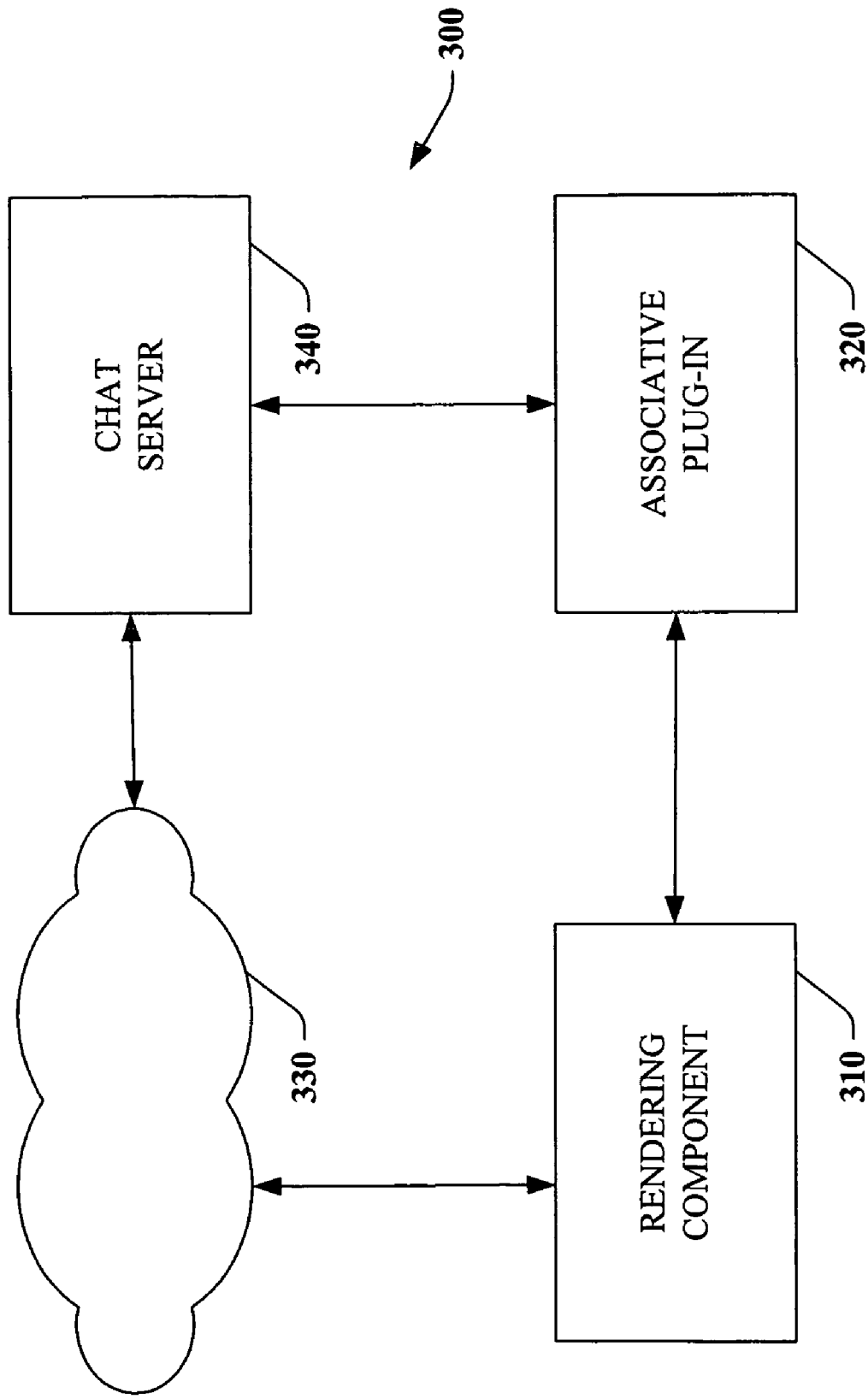
FIG. 3 is a system block diagram of an associative information system.

FIG. 3 is a system block diagram of an associative information system 300. The associative information system 300 includes a rendering component 310 and an associative plug-in component 320. As in preceding examples, the associative plug-in component 320 can be a stand-alone application, can be a pluggable part of another application, or can be some other suitable executable code. The rendering component 310 can access informational content from a network 330. The network 330 can be the Internet, the World Wide Web, an intranet, or another suitable network or information source.

The associative plug-in 320 can access and analyze the informational content that the rendering component 310 has retrieved from the network 330. To analyze the informational content, the associative plug-in 320 can use any suitable approach, including one of the approaches discussed in relation to other figures. The associative plug-in 320 can then connect to a chat server 340 to establish a session in a chat room that is organized around a topic that is related to the informational content.

For example, in operation the rendering component 310 can obtain a Web page from the World Wide Web. The associative plug-in 320 can then analyze the content of the Web page to determine a subject of the Web page. The associative plug-in 320 can then connect to the chat server 340 to locate a chat room that is related to the subject of the Web page. A user can then participate in a discussion in the chat room while continuing to view the web page.

Figure 4:
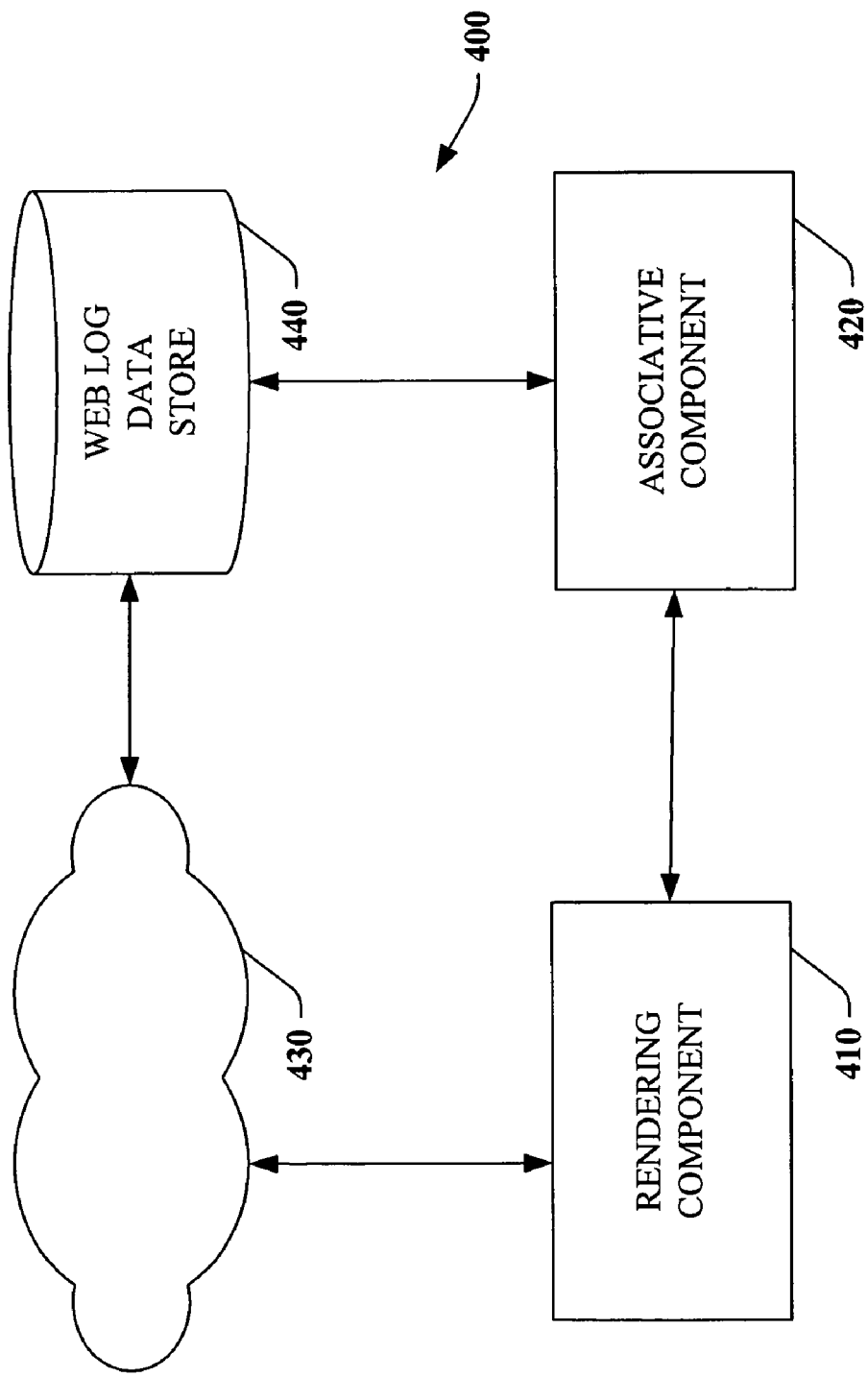
FIG. 4 is a system block diagram of an associative information system.

FIG. 4 is a system block diagram of an associative information system 400. The associative information system 400 includes a rendering component 410 and an associative component 420. The rendering component 410 can be a Web browser or another appropriate component that has a capability to obtain and render information. The rendering component 410 can access information available on a network 430 and communicate that information to the associative component 420.

The associative component 420 can analyze the information it receives from the rendering component 410 and use that information to obtain additional content from a Web log (blog) data store 440. The Web log (blog) data store 440 can include information about Web log (blog) entries and cross-references from Web log (blog) entries to Web sites. A cross-reference can be created for a Web log (blog) entry that deals with a topic that is the same as, or similar to, a topic of a Web site. A cross-reference can also be created for Web log (blog) entry that specifically references a Web site. Other cross-references can also be created.

In use, the rendering component 410 accesses a piece of information from the network 430 and renders that information for presentation to a user. The associative component 420 analyzes the piece of rendered information to discern a general topic or other content-related theme of the information. The associative component 420 accesses the Web log (blog) data store 440 to locate Web log (blog) entries that are cross-referenced with the information that was obtained by the rendering component 410. The associative component 420 can then cause those Web log entries to be presented to the user while the user is still viewing the information.

Instead of or in addition to a Web log (blog) entry, information about a product or service that is related to a subject of Web page can be presented. Such information can be in the form of user reviews or can be advertising from a provider of a product or service itself. Such advertising can be triggered by using keywords from the information already retrieved by the rendering component 410. Therefore, the advertising can be targeted to users who are most likely to respond to such ads. Additionally or alternatively, a user can subscribe to content updates to have a variety of events, such as addition of content, server as a trigger to cause a content update operation to occur automatically.

One possible implementation includes a sidebar component that can provide a contextually intelligent search application. This search application can access content of a Web page that is being viewed by a user and calculate importance of various terms on that Web page, for example, by using an algorithm such as the term frequency-inverse document frequency (TF-IDF) algorithm. The user, when submitting a query through the search application, can obtain query results that are biased in favor of results having content that is similar to the content being viewed.

Figure 5:
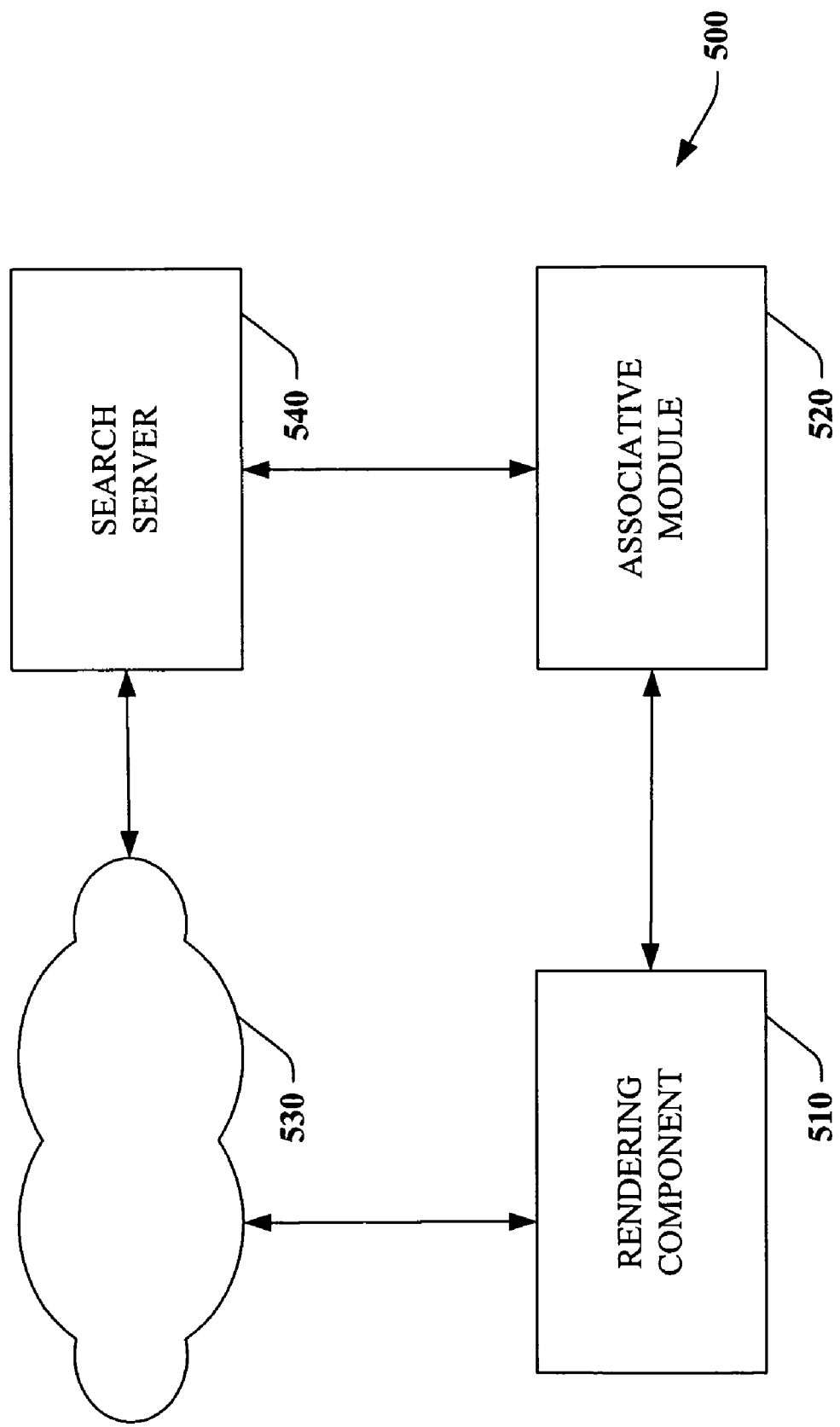
FIG. 5 is a system block diagram of an associative information system.

FIG. 5 is a system block diagram of an associative information system 500. The associative information system 500 includes a rendering module 510 and an associative module 520. The rendering module 510 can retrieve and present information from the World Wide Web 530. The associative module 520 can access and analyze the information retrieved by the rendering module 510 in any of the previously-described manners. The associative module 520 can then use results of such analysis to access a search server 540. The search server 540 can provide results that are responsive to a search query and that are biased toward concepts present in the information from the World Wide Web.

For example, the rendering module 510 can obtain a Web page for a user. The associative module 520 can then analyze contents of that Web page to determine keywords or important concepts. A user can then perform a search for additional information. The associative module 520 can use keywords or concept descriptors that it obtained from the Web page to augment a search query entered by the user. The search server 540 will use the augmented search to obtain responsive information. Results of the search can be biased in favor of those Web pages that are similar, or contain similar concepts, as the Web page originally obtained by the rendering module 510.

Figure 6:
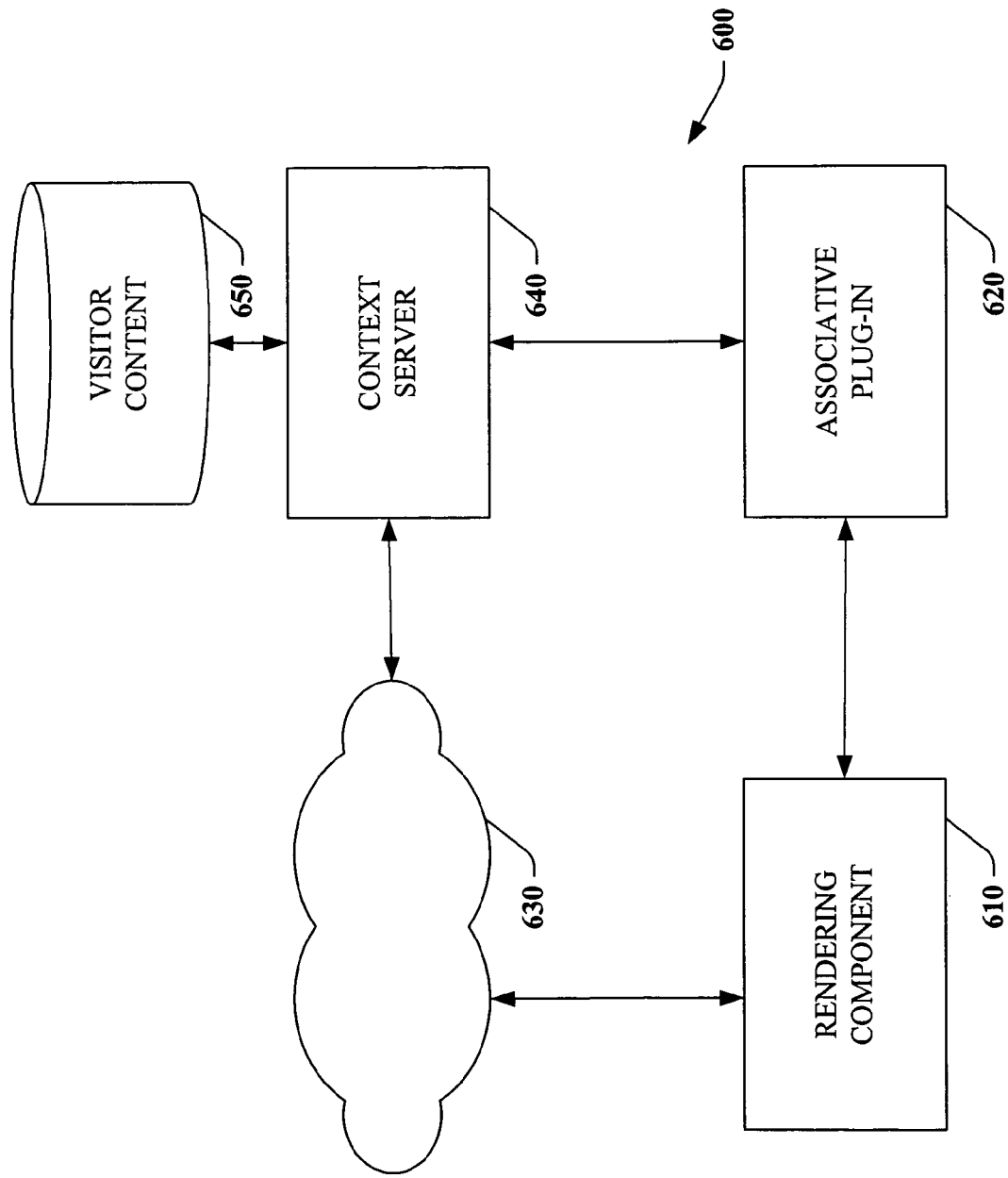
FIG. 6 is a system block diagram of an associative information system.

FIG. 6 is system block diagram of an associative information system 600. The associative information system 600 includes a rendering component 610 that can access web pages from a network 630. An associative component 620 can access the Web page from the rendering component 610 and analyze its contents. Such analysis can be in accordance with any of the procedures previously described. The associative component 620 can then use results of its analysis to contact a context server 640 to obtain additional content.

The context server 640 can access a visitor content data store 650 that can include content, such as user comments, ratings, rankings, feedback, or other content, that is related to the Web page obtained by the rendering component 610. The context server 640 can then send such content to the associative component 620 for presentation to the user. In this fashion, the user can access information from other visitors to the Web page and obtain opinions from those users that relate to the Web page.

A wide variety of types of information that relate to a Web page that is created by other users or viewers of a Web page can be created. This content can include notes and chat sessions such as those previously disclosed or described in conjunction with other figures. Such content can also include backlinks, context-specific or context-aware search functions, Web log (blog) postings, and ranking functions, among others. It should be noted that any of these types of content can be anchored to a location such as a URL or a domain name as previously disclosed or described. Such anchoring can enable association of content with a Web site that is hosted by a party other than a party that hosts the Web site with which the content is associated or anchored.

One type of content that can be created by a user of a Web site is a tag. A tag can be an annotation created by a user that can relate to a Web site or some other information of interest to the creating user. For example, a user can create a tag that includes a short descriptive phrase associated with the Web site. Additionally or alternatively, a rating of a site, such as a multiple star rating or a simple thumbs-up, thumbs-down rating, can be provided. The rating can apply to the Web site itself or to a product or service offered on the Web site, among other things. A link to a related or similar Web site can also be provided, including advertising links. Other types of content can also be added. Further, tags can be ranked according to various attributes and also used to rank Web pages with which those tags are associated.

Figure 7:
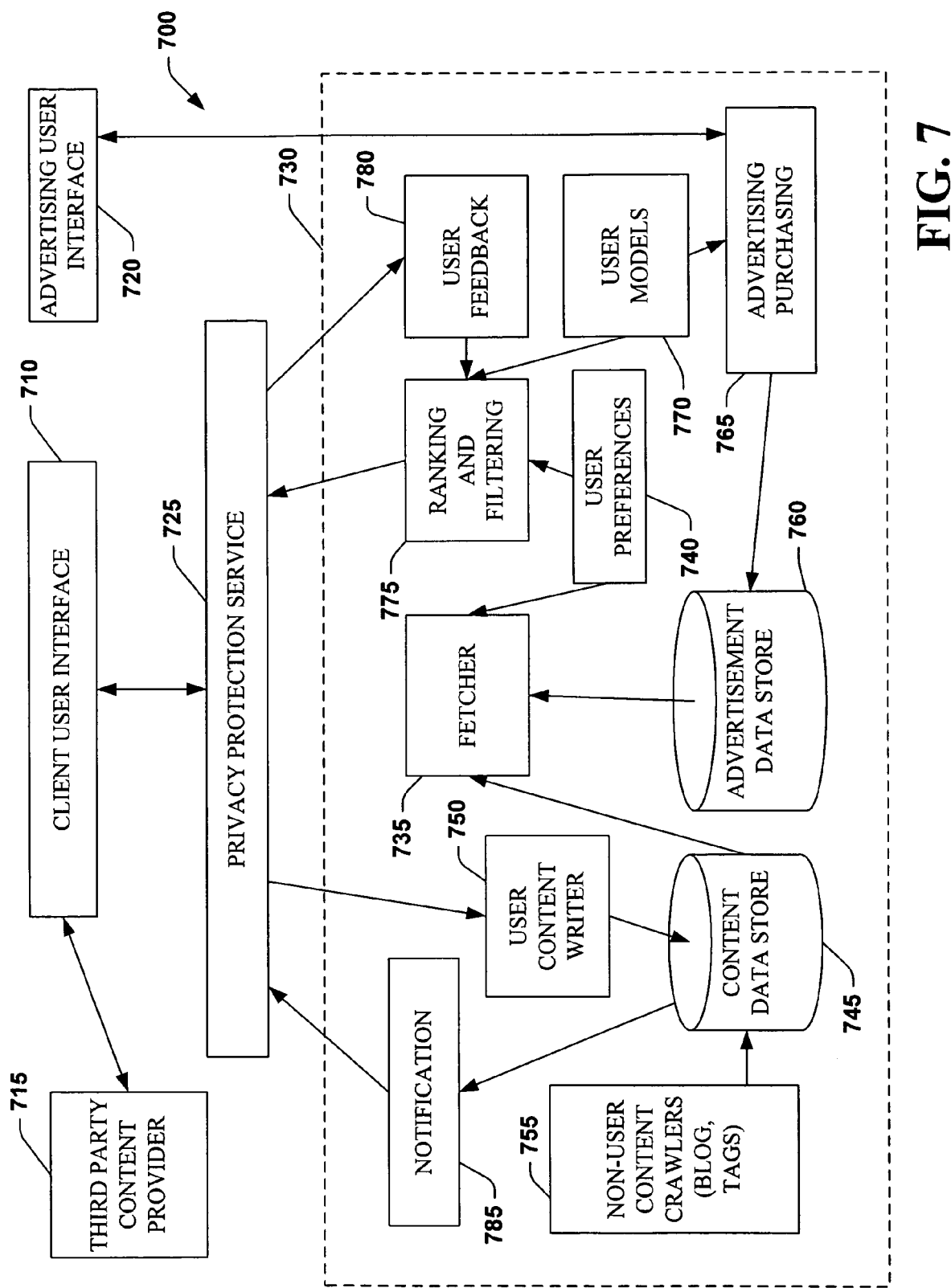
FIG. 7 is a system block diagram of a supplemental content provision system.

FIG. 7 is a system block diagram of a supplemental content provision system 700. The supplemental content provision system 700 can be used to support various types of supplemental content components, specifically including the types of components previously disclosed or described in conjunction with other figures such as notes, chat components, and tags, among others. Specifically, a wide variety of third-party content can be provided to supplement content from a Web site. Those of ordinary skill in the art will recognize from reading this disclosure that not all of the components disclosed or described in conjunction with FIG. 7 are necessary in every implementation. For example, privacy- and advertising-related components can be made optional.

The supplemental content provision system 700 includes a client user interface 710. The client user interface 710 can be a Web browser or another type of user interface that has the ability to obtain information and present that information to a user. Specifically, the client user interface 710 can be a pluggable sidebar that can be displayed to a user in conjunction with primary content that can be presented by another component, such as a Web browser in certain implementations. Pluggability of the client user interface 710 can provide the ability for developers to add support for various types of content that can be associated with primary content in any of the ways disclosed or described in conjunction with other figures.

The client user interface 710 can communicate with a third party content provider 715. The third-party content provider 715 can provide informational content, such as notes, documents such as Web pages, intranet pages, text documents in a variety of formats, graphical or audio information, search-related information including search terms or results and access to search engines, wikis, Web logs (blogs), RSS or other news feeds, chat content including notification-based chat content, instant message information including messages or user names, tags, inlinks, outlinks, and any other information that can be stored or presented in an electronic or machine-readable format, or another type of information to a user by employing a suitable means of communication that can be supported by the client user interface 710. A separate advertising interface 720 can provide a platform for advertisers to create or provide advertising to be presented to the user. The advertising interface 720 can be a Web browser window or some other suitable interface. Specifics of the advertising interface depend largely upon details of a particular implementation as well as a desired level of access to be provided to an advertiser.

The client user interface 710 can send requests for various types of information through a privacy protection service 725. These requests can be requests for content that is associated with or anchored to content provided by the third party content providers 715. The privacy protection service 725 can act to protect an identity or other privacy-related information of a user submitting the requests for information. This protection can be accomplished by obscuring a true user request by including the request among a group of "dummy" requests.

Other techniques, specifically including use of hash or other encryption functions to encode information requests or use of various anonymizer functions can additionally or alternatively be used.

The privacy protection service 725 can send information requests to, and receive information from, an information provision system 730. The information provision system 730 can include a variety of components that can facilitate creation and access of supplemental information. This supplemental information can be manually created by a user, can be automatically created by a script or bot such as a Web crawler, or can be otherwise configured to create content for a user.

The information provision system 730 includes a fetcher 735. The fetcher 735 can receive a request for information that can include a URL, a domain name, or other appropriate identifier, from the client user interface 710. The fetcher 735 can use the request from the client user interface 710 to obtain information from other components. Specifically, the fetcher 735 can obtain a set of preferences for the requesting user from a set of user preferences 740. The fetcher 735 can use any obtained user preferences to tailor information to be provided to the client user interface 710 in accordance with individual desires of a requesting user.

The fetcher 735 can obtain content from a content data store 745. The content data store 745 can be a database, a Web service, or some other appropriate data store. Content that can be included in the content data store 745 can include user-created content from a user content writer 750. The user content writer 750 can provide a means by which content created by a user can be added to the content data store 745. This means can be a Web form or other Web service, among other things. The content data store 745 can also include content from a non-user content module 755. The non-user content module 755 can include such things as scripts, Web crawlers, and tags, among other things.

The fetcher 735 can also obtain advertising information from an advertising data store 760. The advertising data store 760 can include advertising content, including graphical, audio, and video content, from an advertising purchasing module 765. Advertisers using the advertising user interface 720 can purchase or otherwise obtain an ability to place advertisements into the information provision system 730 by using the advertising purchasing module 765. The advertising purchasing module 765 can access user models 770 to allow advertisers to select one or more user models to be used in targeting advertising to users.

A ranking and filtering module 775 can accept content from the fetcher 735 and modify that content in accordance with user preferences 740 and user feedback 780. User feedback 780 can be created by the user of the client user interface 710 and can be used to customize content prior to provision of the content to the client user interface 710. Modified content can be provided to the client user interface 710 by the ranking and filtering module 775.

The content data store 745 can also create a notification 785 that can be sent to the client user interface 710. A user of the client user interface 710 can subscribe to such notifications that can be used to trigger requests for information from the client user interface 710. The content data store 745 can generate an event upon modification of included content. This event can cause generation of the notification 785. The notification 785 can be sent to the client user interface 710 which can use the notification as a triggering event to request new or updated content from the information provision system 730.

Various components of the information provision system 730 can use artificial intelligence-based components to provide functionality to the system. For example, the ranking and filtering module 775 can employ classifiers to assign ranks to content to be provided to the client user interface 710. Also, for example, the advertising purchasing module 765 can use artificial intelligence-based components to match user models 770 with users in desired target demographic groups.

The disclosed and described components, for example in connection with the previously mentions matching or inference tasks, among others, can employ various artificial intelligence-based schemes for carrying out various tasks. For example, demographic matching or content ranking in accordance with user feedback or preferences can be carried out by a neural network, an expert system, a rules-based processing component, or a support vector machine.

A classifier is a function that maps an input attribute vector, $X=(x_1, x_2, x_3, x_4, \ldots x_n)$, to a confidence that the input belongs to a class, that is, $f(X)=\text{confidence}(\text{class})$. Such a classification can employ a probabilistic and/or statistical-based analysis (for example, factoring into the analysis utilities and costs) to prognose or infer an action that a user desires to be automatically performed. In the case of a content provision system, for example, attributes of a reference set of information such as user preferences to be used in a comparison can be used to determine whether attributes of a piece of content can be considered to match the preferences of the user.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including, but not limited to, matching and ranking functions.

In operation, the supplemental content provision system 700 can function as follows. A user can operate the client user interface 710 to obtain a Web page. The Web page can be provided over a network connection such as a LAN, a WAN, an intranet, or the Internet, among others. The client user interface 710 can use an anchoring scheme, such as any of the anchoring schemes disclosed or described herein, to identify additional content to obtain from the third party content provider 715. Based upon the anchor, the client user interface 710 can request additional content from the information provision system 730. This additional content can be notes, chat room connections, tags, advertisements, or any combination of these, among others.

The client user interface sends its request to the privacy protection service 725. This request can be triggered by the notification 785. The privacy protection service 725 anonymizes the request by stripping any personally-identifiable information from the request and forwards the request to the fetcher 735. Additionally or alternatively, the privacy protection service 625 can include the request in with a group of dummy requests to hide the real request from anyone who may be monitoring the requests.

The fetcher 735 obtains user preferences (that can be anonymized as well) from the user preferences 740 and uses those preferences to obtain content from the content data store 745 and advertisements from the advertisement data store 760. The fetcher sends the content and advertisements to the ranking and filtering module 775 that ranks and filters the content and advertisements in accordance with the user preferences 740, user models 770, and user feedback 780. The ranking and filtering module 775 sends the content and advertisements to the privacy protection service 725 that relays the content and advertisements to the client user interface 710.

The user can use the client user interface 710, through the privacy protection service 725, to create user content by accessing the user content writer 750. The user content writer 750 places the user-created content into the content data store 745. Additionally or alternatively, the non-user content 755 can be placed into the content data store 745 and included in content ultimately sent to the client user interface 710.

The user can also access the user feedback module 780 to provide explicit feedback for the content provided to the client user interface 710. The feedback can include measures of quality such as relevance along with requests for more information of the type provided or requests to block certain content. User feedback can be used in ranking and filtering tasks and can specifically be used to assist in training any artificial intelligence-based components of the ranking and filtering module 775.

Advertisers can use the advertising user interface 720 to access the advertising purchasing module 765. Those advertisers can purchase advertising space and access the user models 770 to define target recipients of the advertising. Advertisers can also use the advertiser user interface 720 and the advertising purchasing module 765 to upload or otherwise provide specific advertising to be provided to users. These advertisements are stored in the advertising data store 760.

Figure 8:
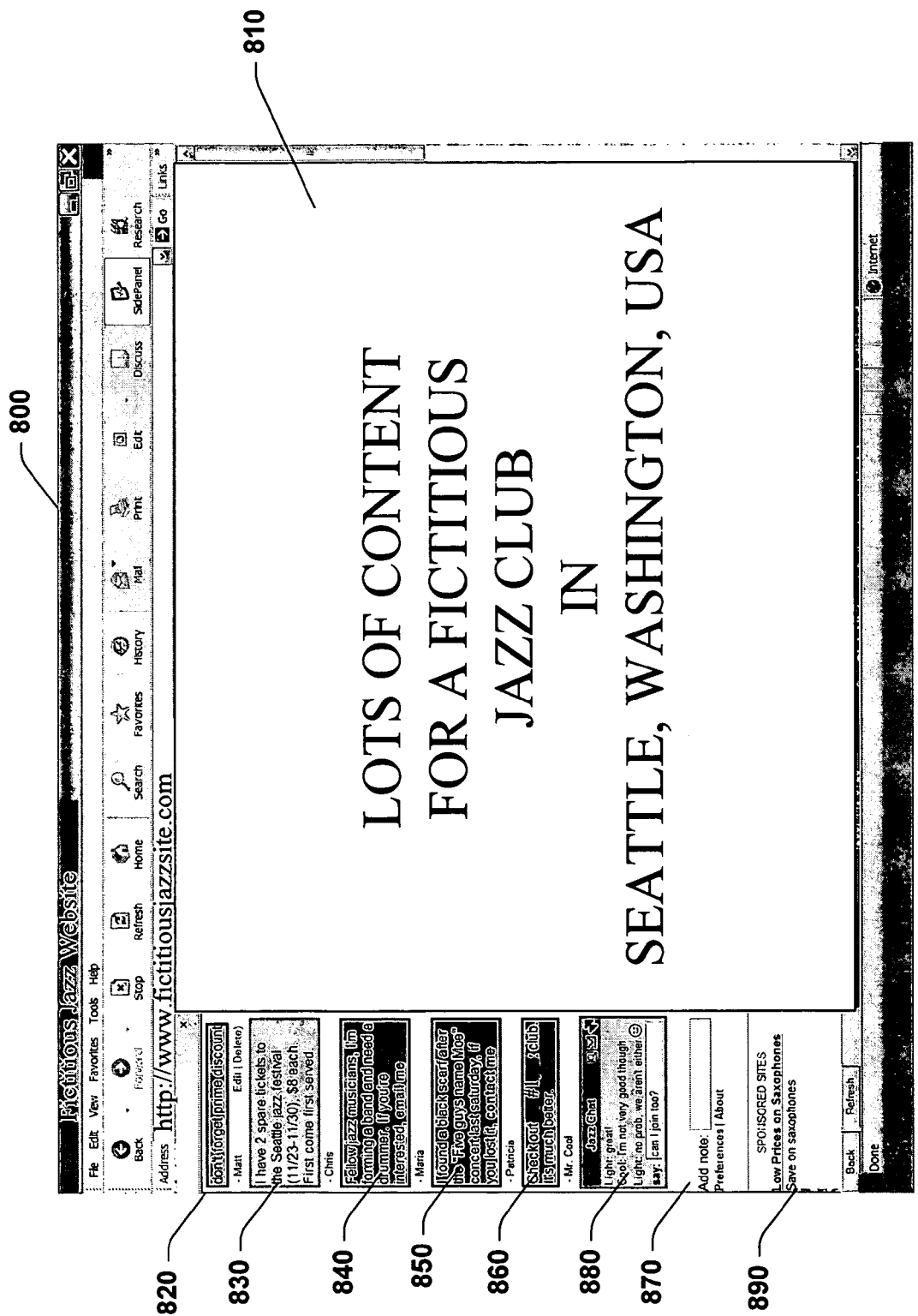
FIG. 8 is a diagram of an exemplary user interface.

FIG. 8 is a diagram of an exemplary user interface 800. The user interface 800 can provide a logical arrangement of elements within which information can be presented to a user. Specifically, the user interface 800 can provide a platform that a user can employ to obtain content from an information provider such as a Web site as well as secondary or user-created content that can be anchored to the content from the information provider. Such secondary or user-created content can be presented alongside the content from the information provider.

The user interface 800 can include a primary information pane 810. In this example, which is based upon a Web browsing platform and which can be modified to accommodate variations previously disclosed or described in conjunction with other figures, the primary information pane 810 can be used to render or display a Web page to which a user has navigated. Standard Web page elements, such as text, graphics, multimedia content, and embedded code, among other things, can be rendered in the primary information pane 810. The Web page rendered in the primary information pane 810 can be reached by entering a URL in a navigation bar, by performing a search using a search engine, or by clicking on a hyperlink from another Web page, among other methods.

A secondary information pane or sidebar 820 can be displayed near the primary information pane 810. Although called a sidebar, the secondary information pane or sidebar 820 can be part of a single window that also includes the primary information pane 810, as shown, or can be presented in a separate window. Additionally or alternatively, the secondary information pane or sidebar 820 can be positioned at the top or bottom of the window as well as on either the left or right sides. Such positioning can be in accordance with a user-selectable preference for the user interface 800.

The secondary information pane or sidebar 820 can provide an area within which various elements, such as notes, chat boxes, and advertising, such as the notes, chat boxes, and advertising disclosed and described herein in conjunction with other figures, can be displayed. A note 830 includes a message from a user indicating that the user has tickets for sale for an event that is to occur in the same approximate geographic location as an establishment described by a Web page rendered in the primary information pane 810. Other messages are included in notes 840, 850, 860.

An add note component 870 provides a text box and an entry control that allows a user to create and add a note that can be anchored to the domain name of the Web site currently being viewed in the primary information pane 810. A chat box 880 provides an interface for a user to join a chat session that is related to a general topic of the currently-viewed Web site. An advertising area 890 provides a space where targeted advertising can be delivered to a user.

With reference to FIGS. 9-12, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 9:
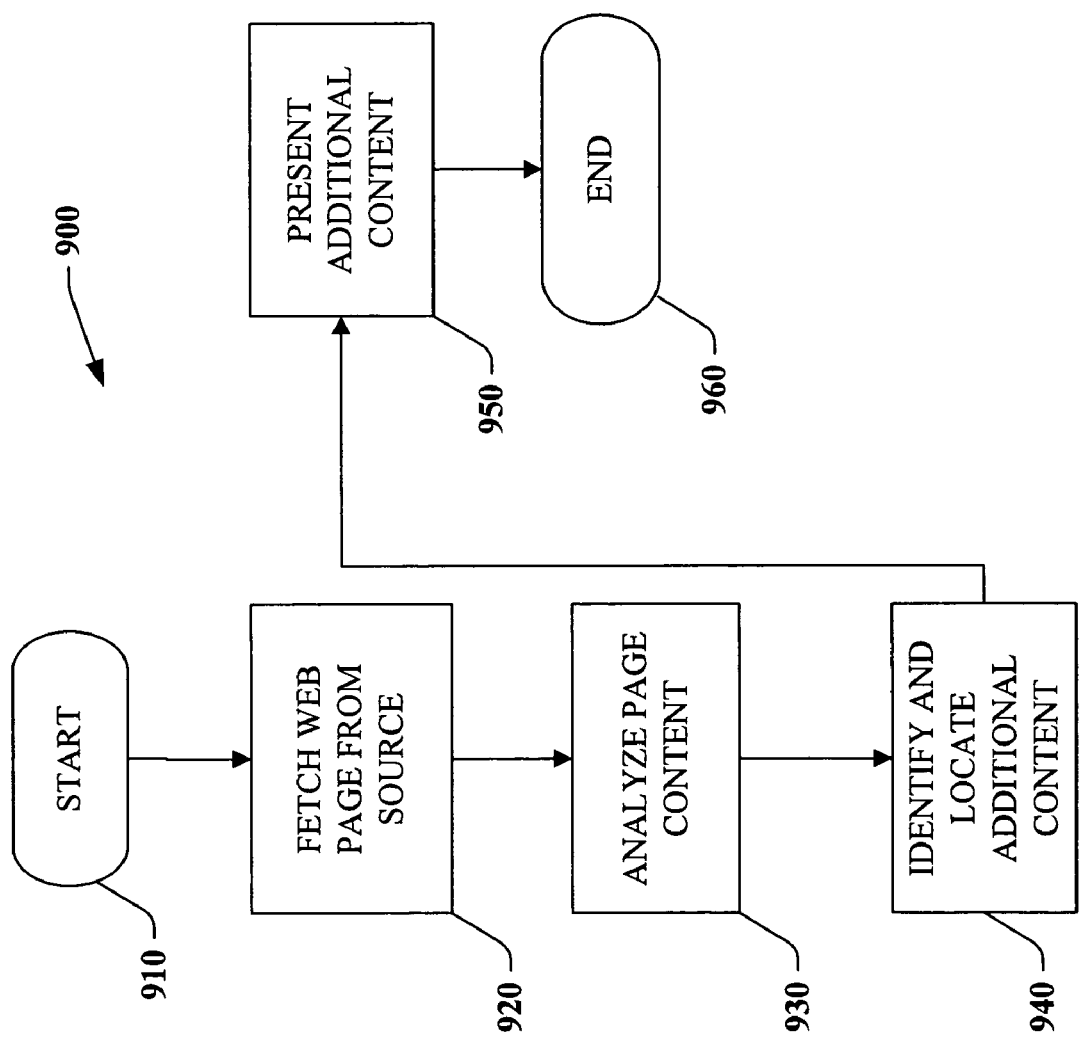
FIG. 9 is a flow diagram depicting a general processing flow of a method that can be employed in accordance with components that are disclosed and described herein.

FIG. 9 is a flow diagram illustrating a general processing flow of a method 900 that can be employed in conjunction with components that are disclosed or described herein in conjunction with other figures. The method 900 can be used to obtain additional content related to content of interest to a user. Specifically, the additional content can be obtained by analyzing content of a currently-viewed Web page and locating additional content related to content of that Web page.

Processing of the method 900 begins at START block 910 and proceeds to process block 920. At process block 920, a Web page is fetched from some location on a network. The network can be a local area network (LAN), a wide area network (WAN), an intranet, or the Internet, among others. Content of the fetched Web page is analyzed at process block 930. Various analysis algorithms can be employed to find important or relevant terms in a Web page. Among those algorithms is the TF-IDF algorithm previously discussed in conjunction with other figures.

At process block 940, additional content that is related to content of the fetched Web page is identified and obtained. This content can be obtained from a location other than the network location that provided the Web page being viewed or the Web page that was analyzed. The content can be related in a variety of ways, including, but not limited to, being topically related or being anchored to a URL of the Web page. Specifically, the obtained content can be created by a current user or by other users who have made such content available for public or group viewing. At process block 950, the obtained additional content is presented to a user. Presentation can occur in an identified region of a human-computer interface, such as a graphical user interface. Processing of the method 900 terminates at END block 960.

Figure 10:
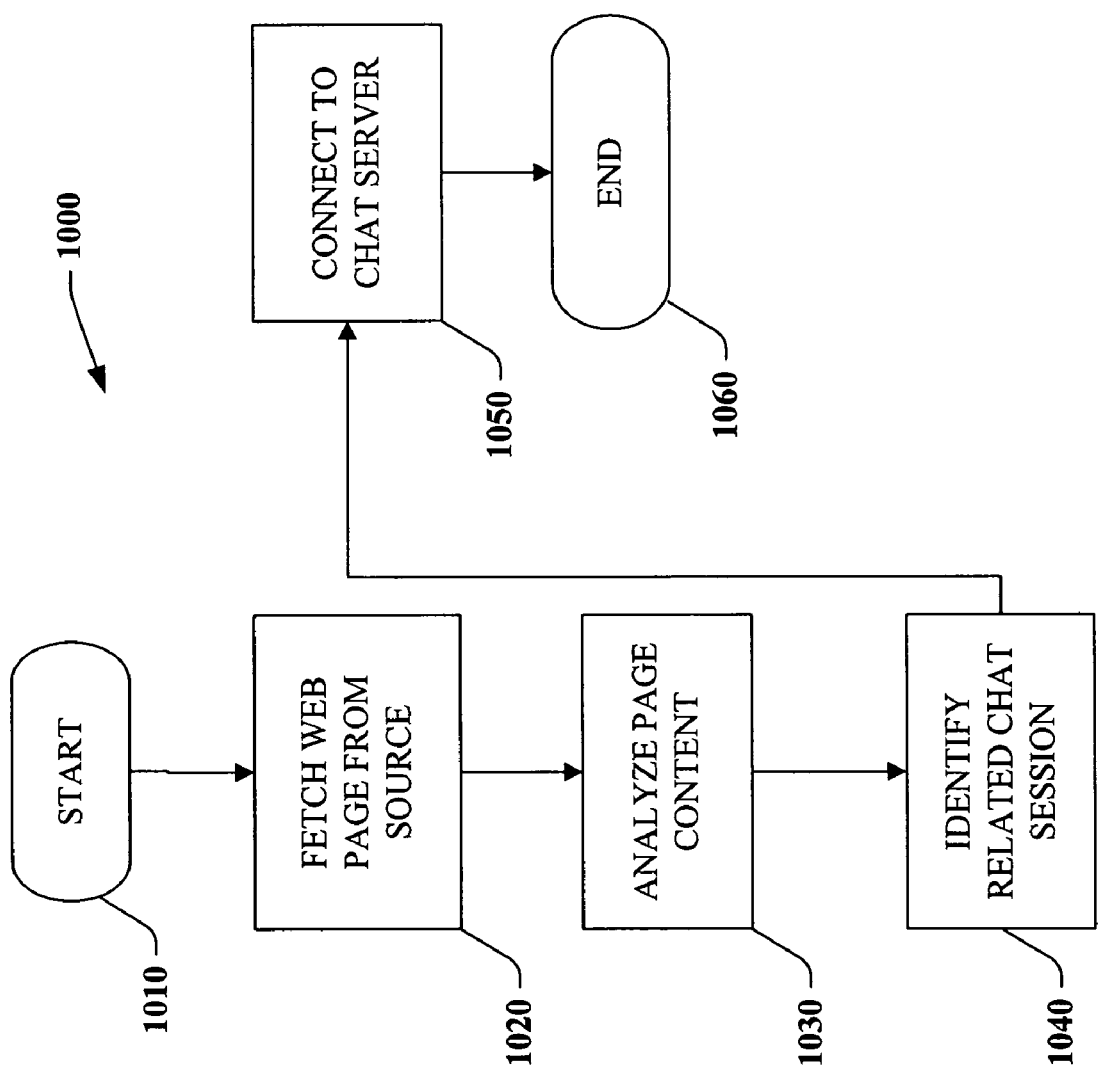
FIG. 10 is a flow diagram depicting a general processing flow of a method that can be employed in accordance with components that are disclosed and described herein.

FIG. 10 is a flow diagram illustrating a general processing flow 1000 that can be employed in conjunction with components that are disclosed or described herein in conjunction with other figures. The method 1000 can be used to obtain interactive services that related to content of interest to a user. Specifically, the interactive services can be obtained by analyzing content of a currently-viewed Web page and locating interactive services that are related to content of that currently-viewed Web page.

Processing of the method 1000 begins at START block 1010 and proceeds to process block 1020. At process block 1020, a Web page is obtained from a location on a network. This network can be a LAN, a WAN, an intranet, or the Internet, among others. At process block 1030, content of the Web page is analyzed. As in other examples, the TF-IDF algorithm can be used to analyze the Web page. Other algorithms can also be used.

An interactive service, in this example a chat session, that is related to the content of the Web page is identified at process block 1040. Identification can be based upon a keyword search for chatroom topics, among other methods. At process block 1050, a connection is made to at least one identified chat session and chatroom content is presented to a user. Processing of the method 1000 terminates at END block 760.

Figure 11:
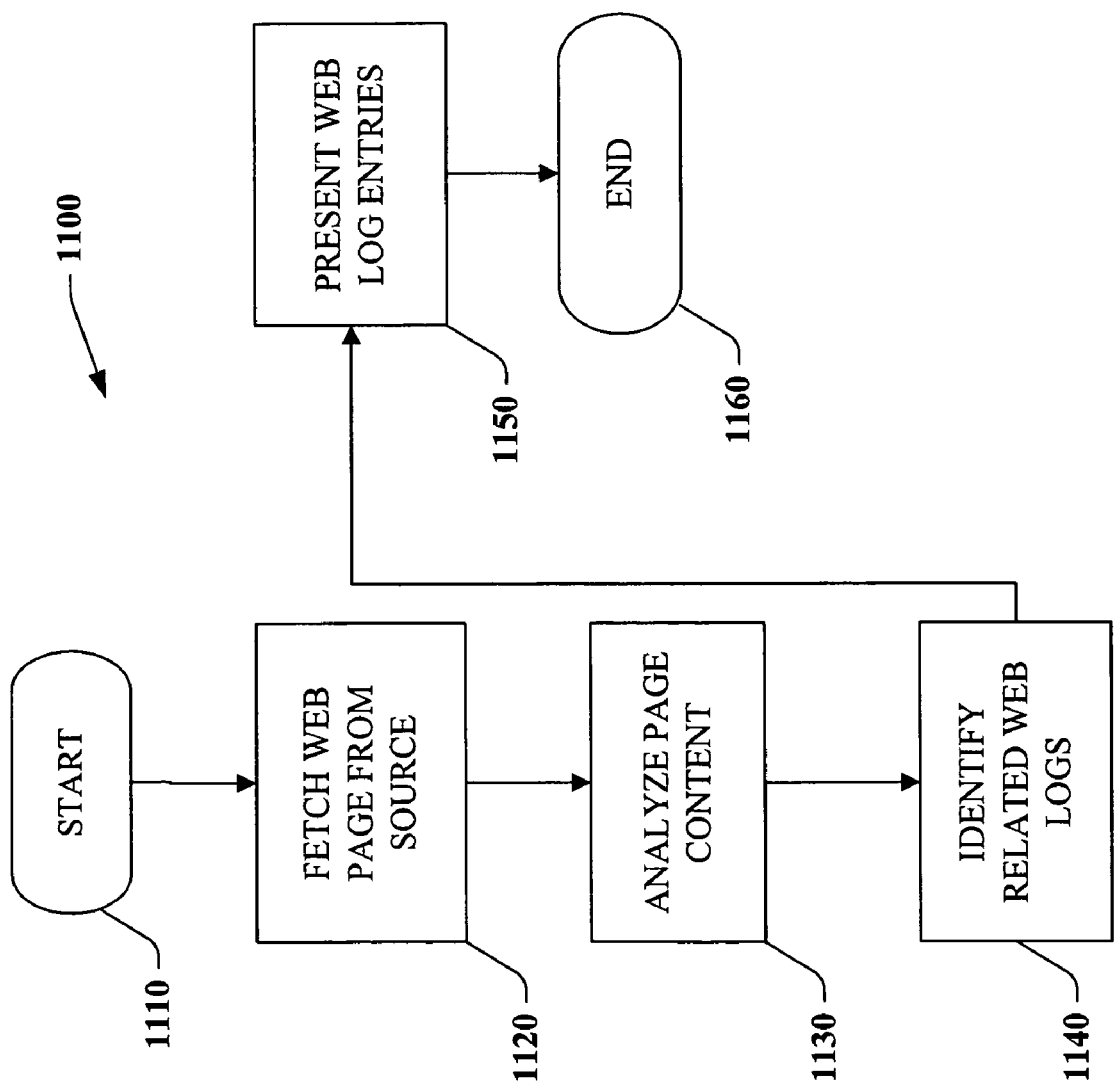
FIG. 11 is a flow diagram of a general processing flow of a method can be employed in accordance with components that are disclosed and described herein.

FIG. 11 is a flow diagram illustrating a general processing flow of a method 1100 that can be employed in conjunction with components that are disclosed or described herein in conjunction with other figures. The method 1100 can be used to obtain additional content that is related to content of interest to a user. Specifically, the additional content can be obtained by analyzing content of a currently-viewed Web page and locating additional content that can reference content of that currently-viewed Web page.

Processing of the method 1100 begins at START block 1110. Processing then continues to process block 1120 where a Web page is fetched. The Web page can be fetched from some Web server that can be local or remote. A remote Web server can be accessed by using a network such as a LAN, a WAN, an intranet, or the Internet, among others. At process block 1130, content of the fetched Web page is analyzed. Analysis of the content of the Web page can be according to a variety of algorithms, specifically including the TF-IDF algorithm. Another suitable algorithm can be substituted for the TF-IDF algorithm.

Content from Web logs that is relevant to content of the fetched Web page is identified and obtained at process block 1140. Web log content can be relevant in a variety of ways. For example, a Web log can specifically discuss content on the Web page that was analyzed. A Web log entry can also provide a hyperlink to the analyzed Web page. Also, a Web log entry can simply discuss the same or a similar topic as the analyzed Web page. Such Web log content is presented to user at process block 1150. Processing of the method 1100 terminates at END block 1160.

Figure 12:
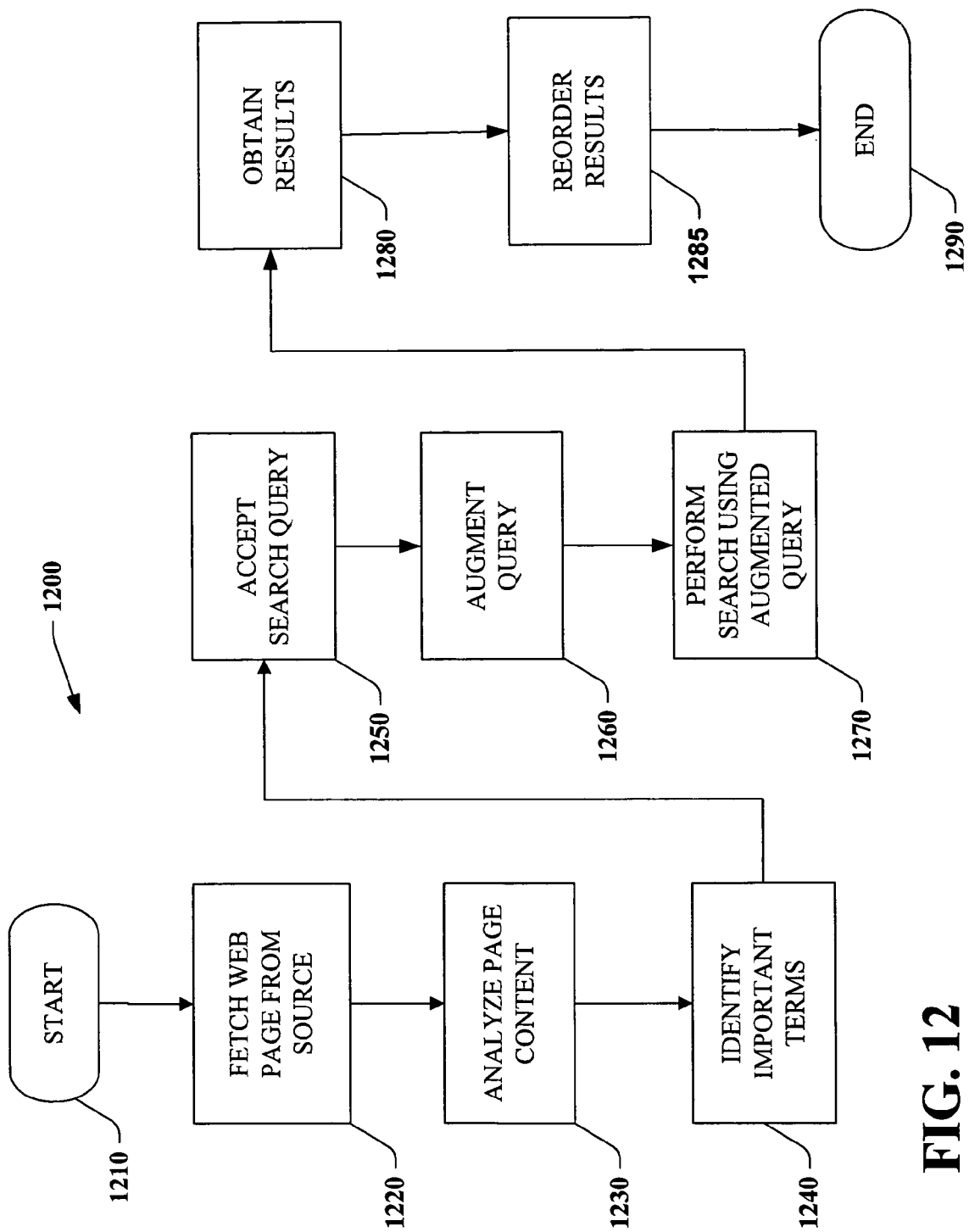
FIG. 12 is a flow diagram depicting a general processing flow of a method that can be employed in accordance with components that are disclosed and described herein.

FIG. 12 is a flow diagram illustrating a general processing flow of a method 1200 that can be employed in conjunction with components that are disclosed or described herein in conjunction with other figures. The method 1200 can be used to obtain additional content related to content of interest to a user. Specifically, the additional content can be obtained by analyzing content of a currently-viewed Web page and performing a search to create a set of results that can be biased in favor of results that include content that is similar to content of that analyzed Web page.

Processing of the method 1200 begins START block 1210. At process block 1220, a Web page is fetched from some information server, such as a Web server. The information server can be local or remote. In the case where the information server is remote, the Web page can be obtained over a network such as a LAN, a WAN, an intranet, or the Internet, among others.

The fetched Web page is analyzed at process block 1230. Important terms or concepts from the Web page are identified at process block 1240. Analysis and identification tasks can be performed using various algorithms, including the TF-IDF algorithms discussed in conjunction with other figures. Processing of the method 1200 continues at process block 1250 where a search query is accepted from the user.

At process block 1260, the search query accepted from the user is optionally augmented by adding important terms or concepts identified from the analyzed Web page to the query. A search, using the augmented query, is performed at process block 1270. Augmentation of the query in this manner can be used to bias results of the search in favor of results that include content that is similar to content of the analyzed Web page. Searches can also optionally be refined in a variety of ways, such as by limiting a query to a current domain or to pages that link to a currently-viewed page. Other modifications are also possible. Results of the search are obtained at process block 1280 and can be presented to a user through some interface. At process block 1285, the obtained results are optionally reordered. Processing of the method 1200 terminates at END block 1290.

Figure 13:
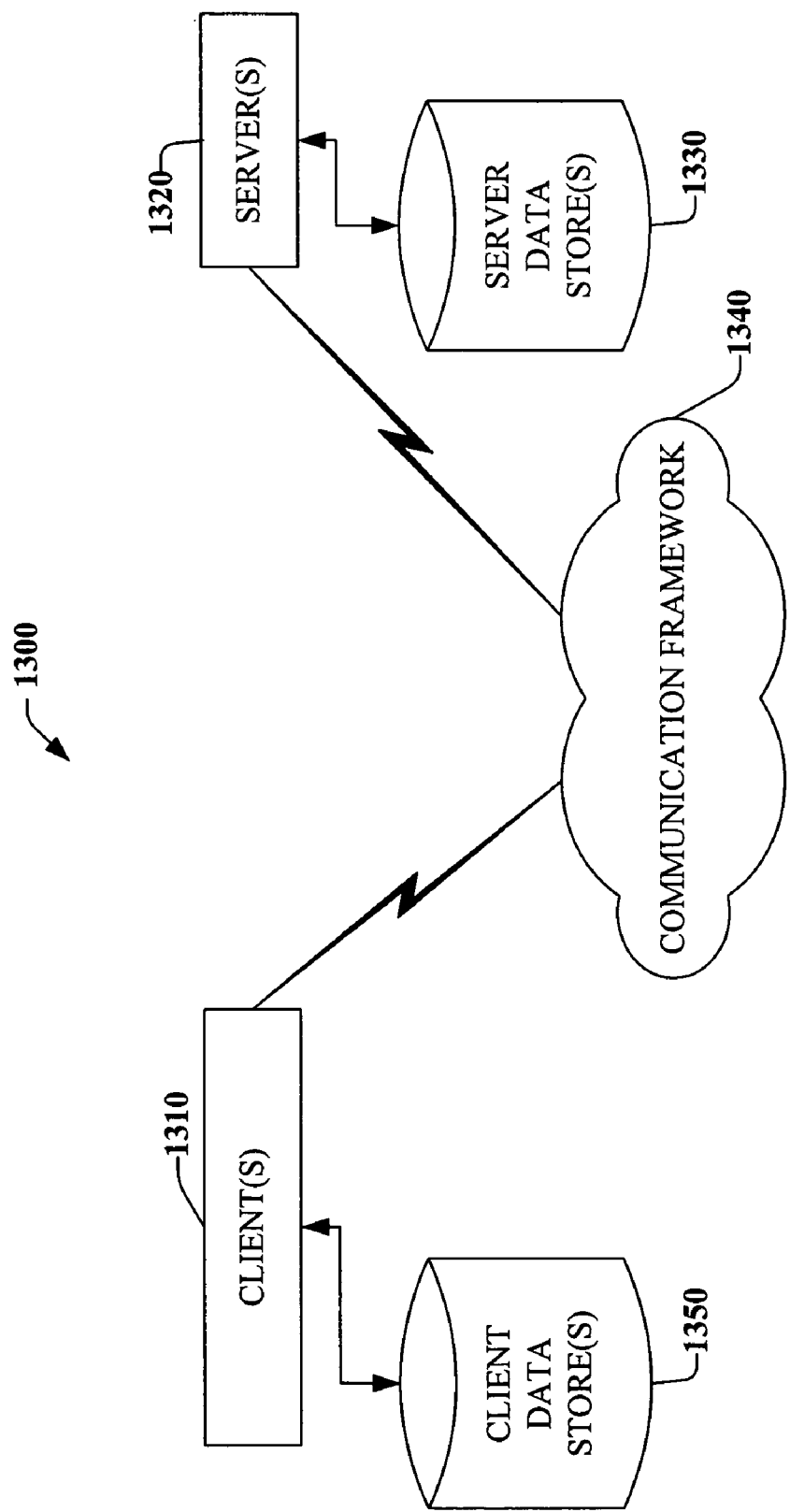
FIG. 13 illustrates an exemplary networking environment.
Figure 14:
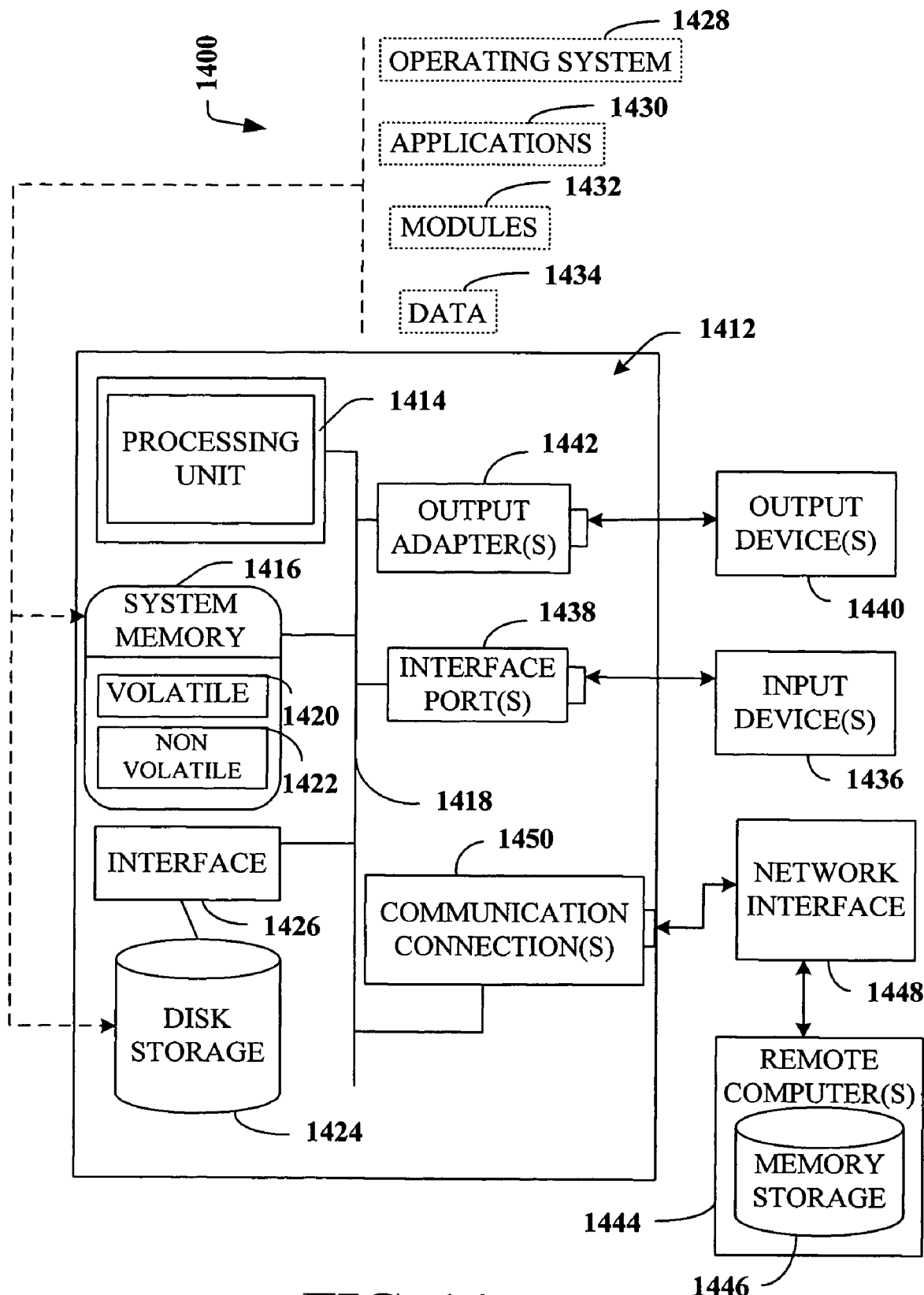
FIG. 14 illustrates an exemplary computing environment.

In order to provide additional context for implementation, FIGS. 13-14 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads or processes to perform transformations by employing the subject invention, for example.

One possible means of communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1340.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. For example, FIG. 14 illustrates a disk storage 1424. The disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. The operating system 1428, which can be stored on the disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. The input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-readable storage medium having computer executable instructions encoded thereon, the computer executable instructions programmed to, upon execution by at least one processor, configure a computer implemented system for associating information, the computer-readable storage medium comprising:
    an association module executing on the at least one processor that analyzes, using a term frequency-inverse document frequency technique, content of a first piece of information associated with a first network service, comprising a web page service that provides at least one web page, to create a summary of the content of the first piece of information, the summary comprising anchoring information, and uses the anchoring information to associate the first piece of information with a second piece of information associated with a second network service, comprising one of a note service, a news feed service, a chat session service, a notification-based chat session service, an instant message service, or an advertisement service, the anchoring information includes one or more of a domain name, a fully qualified uniform resource locator, a partially-qualified uniform resource locator, a relative uniform resource locator of a Web resource, or at least one keyword in the content associated with the first piece of information;
    wherein the first niece of information comprises at least one of the at least one web page or one of a text document, a blog entry, a wiki, an image file, an audio file, or a multimedia file, associated with the at least one web page;
    wherein the second niece of information comprises at least one of a note, an intranet page, a text document, an image file, an audio file, a search term, a search result, information related to an interface for a search engine, an RSS feed, a news feed, information related to a chat session, information related to notification-based chat session, an instant message, a tag, a rating, an in-link, an out-link, or an advertisement;
    a privacy module that protects personal information of a user of the association module, by at least obscuring a request of the user;
    a ranking and filtering module that employs one or more classifiers to assign one or more ranks to a plurality of nieces of information, wherein the second niece of information is associated with the first niece of information based on an assigned rank; and
    a rendering module that presents the second piece of information for use.

2. The computer-readable storage medium of claim 1, further comprising a creation module that creates the second piece of information.

3. The computer-readable storage medium of claim 2, wherein the creation module is one of a text editor, a graphics application, an audio application, a multimedia application, a syndication application, a chat application, an instant messaging application, a tagging application, or a rating application.

4. The computer-readable storage medium of claim 1, wherein the rendering module is pluggable.

5. A computer-implemented method for associating pieces of information, comprising:
    employing a processor executing computer executable instructions stored on a computer readable storage medium to implement the following acts:
        analyzing content of a first piece of information, comprising at least a portion of a web page, wherein the content of the first piece of information is analyzed using a term frequency-inverse document frequency method to facilitate generating a summary of the content of the first piece of information, the first piece of information is received via a first network service, which is a web page service that provides the at least a portion of the web page;
        generating the summary of the content of the first piece of information, comprising anchoring information;
        associating the first piece of information with a second piece of information based at least in part on the anchoring information, wherein the second piece of information is:
            received via a disparate network service, comprising one of a note service, a news feed service, a chat session service, a notification-based chat session service, an instant message service, or an advertisement service; and
            associated with the first niece of information based on a classifier employed by a ranking and filtering module that assigns one or more ranks to a plurality of nieces of information;
        obtaining the second piece of information, wherein the anchoring information includes one or more of a domain name, a fully qualified uniform resource locator, a partially-qualified uniform resource locator, a relative uniform resource locator of a Web resource, or a keyword in content associated with the first piece of information;
    wherein the first niece of information comprises at least one of the web page, a text document associated with the web page, a blog entry associated with the web page, a wiki associated with the web page, an image file associated with the web page, an audio file associated with the web page, or a multimedia file associated with the web page;

wherein the second niece of information comprises at least one of a note, an intranet page, a text document, an image file, an audio file, a search term, a search result, information related to an interface for a search engine, an RSS feed, a news feed, information related to a chat session, information related to a notification-based chat session, an instant message, a tag, a rating, an in-link, an out-link, or an advertisement;

protecting personal information of a user by at least obscuring a request of the user; and presenting the second piece of information to the user together with the first piece of information.

6. The method of claim 5, further comprising creating the second piece of information.

7. The method of claim 6, wherein creating the second piece of information includes at least one of using a text editor, using a graphics application, using an audio application, using a multimedia application, using a syndication application, using a chat application, using an instant messaging application, using a tagging application, or using a rating application, to facilitate creating the second piece of information.

8. A system for associating pieces of information, comprising:

at least one processor that facilitates associating pieces of information;

means for analyzing content of a first piece of information, comprising at least a portion of a web page, associated with a first service, which is a web page service that provides the at least a portion of a web page, to facilitate generating a summary of the content of the first piece of information;

means for generating the summary of the content of the first piece of information, comprising anchoring information;

means for using the anchoring information from the first piece of information to obtain a second piece of information associated with a second service, comprising one of a note service, a news feed service, a chat session service, a notification-based chat session service, an instant message service, or an advertisement service, the anchoring information comprising one or more of a domain name, a fully qualified uniform resource locator, a partially-qualified uniform resource locator, a relative uniform resource locator of a Web resource, or a keyword in content associated with the first piece of information;

means for ranking a plurality of pieces of information, wherein the second piece of information is associated with the first piece of information based on an assigned rank;

wherein the first piece of information comprises at least one of the web page, a text document associated with the web page, a blog entry associated with the web page, a wiki associated with the web page, an image file associated with the web page, an audio file associated with the web page, or a multimedia file associated with the web page;

wherein the second niece of information comprises at least one of a note, an intranet page, a text document, an image file, an audio file, a search term, a search result, information related to an interface for a search engine, an RSS feed, a news feed, information related to a chat session, information related to a notification-based chat session, an instant message, a tag, a rating, an in-link, an out-link, or an advertisement;

means for creating the second piece of information;

means for protecting personal information of a user; and means for presenting the second piece of information to the user together with the first piece of information.

9. The system of claim 8, wherein the means for creating the second piece of information includes at least one of a text editor, a graphics application, an audio application, a multimedia application, a blogging application, a syndication application, a Web publishing application, a chat application, an instant messaging application, a tagging application, or a rating application.

10. A computer implemented system for associating information, comprising:

at least one processor that facilitates associating information;

an association module executing on the at least one processor that analyzes content of a first piece of information, to create a summary of the first piece of information, and uses anchoring information to associate the first piece of information and a second piece of information in a computer memory, wherein the content of the first piece of information is analyzed using a term frequency-inverse document frequency technique to facilitate creation of the summary of the first piece of information, the anchoring information includes one or more of a domain name, a fully qualified uniform resource locator, a partially-qualified uniform resource locator, a relative uniform resource locator of a Web resource, or a keyword in content associated with the first piece of information;

a ranking module that employs one or more classifiers to assign one or more ranks to a plurality of pieces of information, wherein the second niece of information is associated with the first piece of information based on an assigned rank;

a rendering module that presents the second piece of information for use;

wherein the first piece of information is associated with a first network service comprising a web page service that provides the first piece of information associated with at least one web page, and is one of the at least one web page, a text document associated with the at least one web page, a blog entry associated with the at least one web page, a wiki associated with the at least one web page, an image file associated with the at least one web page, an audio file associated with the at least one web page, or a multimedia file associated with the at least one web page;

wherein the second piece of information is associated with a second network service, comprising one of a note service, a news feed service, a chat session service, a notification-based chat session service, an instant message service, or an advertisement service, and is one of a note, an intranet page, a text document, an image file, an audio file, a search term, a search result, information related to an interface for a search engine, an RSS feed, a news feed, information related to a chat session, an interface for information related to a notification-based chat session, an instant message, a tag, a rating, an in-link, an out-link, or an advertisement; and a privacy module that protects personal information of a user of the association module, by at least obscuring a request of the user.

* * * * *

UNITED STATES PATENT AND TRADEMARK OFFICE
CERTIFICATE OF CORRECTION

| | | |
|---|---|---|
| PATENT NO. | : 7,734,631 B2 | Page 1 of 1 |
| APPLICATION NO. | : 11/227937 | |
| DATED | : June 8, 2010 | |
| INVENTOR(S) | : Matthew R. Richardson et al. | |

It is certified that error appears in the above-identified patent and that said Letters Patent is hereby corrected as shown below:

In column 19, line 63, in Claim 1, delete "niece" and insert -- piece --, therefor.

In column 20, line 1, in Claim 1, delete "niece" and insert -- piece --, therefor.

In column 20, line 14, in Claim 1, delete "nieces" and insert -- pieces --, therefor.

In column 20, line 14, in Claim 1, delete "niece" and insert -- piece --, therefor.

In column 20, line 15, in Claim 1, delete "niece" and insert -- piece --, therefor.

In column 20, line 55, in Claim 5, delete "niece" and insert -- piece --, therefor.

In column 20, line 58, in Claim 5, delete "nieces" and insert -- pieces --, therefor.

In column 20, line 66, in Claim 5, delete "niece" and insert -- piece --, therefor.

In column 21, line 6, in Claim 5, delete "niece" and insert -- piece --, therefor.

In column 21, line 62, in Claim 8, delete "niece" and insert -- piece --, therefor.

In column 22, line 35, in Claim 10, delete "niece" and insert -- piece --, therefor.

Signed and Sealed this
Fifteenth Day of February, 2011

David J. Kappos
*Director of the United States Patent and Trademark Office*